Nov. 7, 1961        R. Y. MINER ET AL        3,007,635
ORDNANCE APPARATUS FOR COMPUTING TARGET
OBSERVATION ERROR CORRECTION FACTORS
Filed Jan. 19, 1946                    2 Sheets-Sheet 1

INVENTORS
Richard Y. Miner
BY Clifford F. Abt
ATTORNEYS

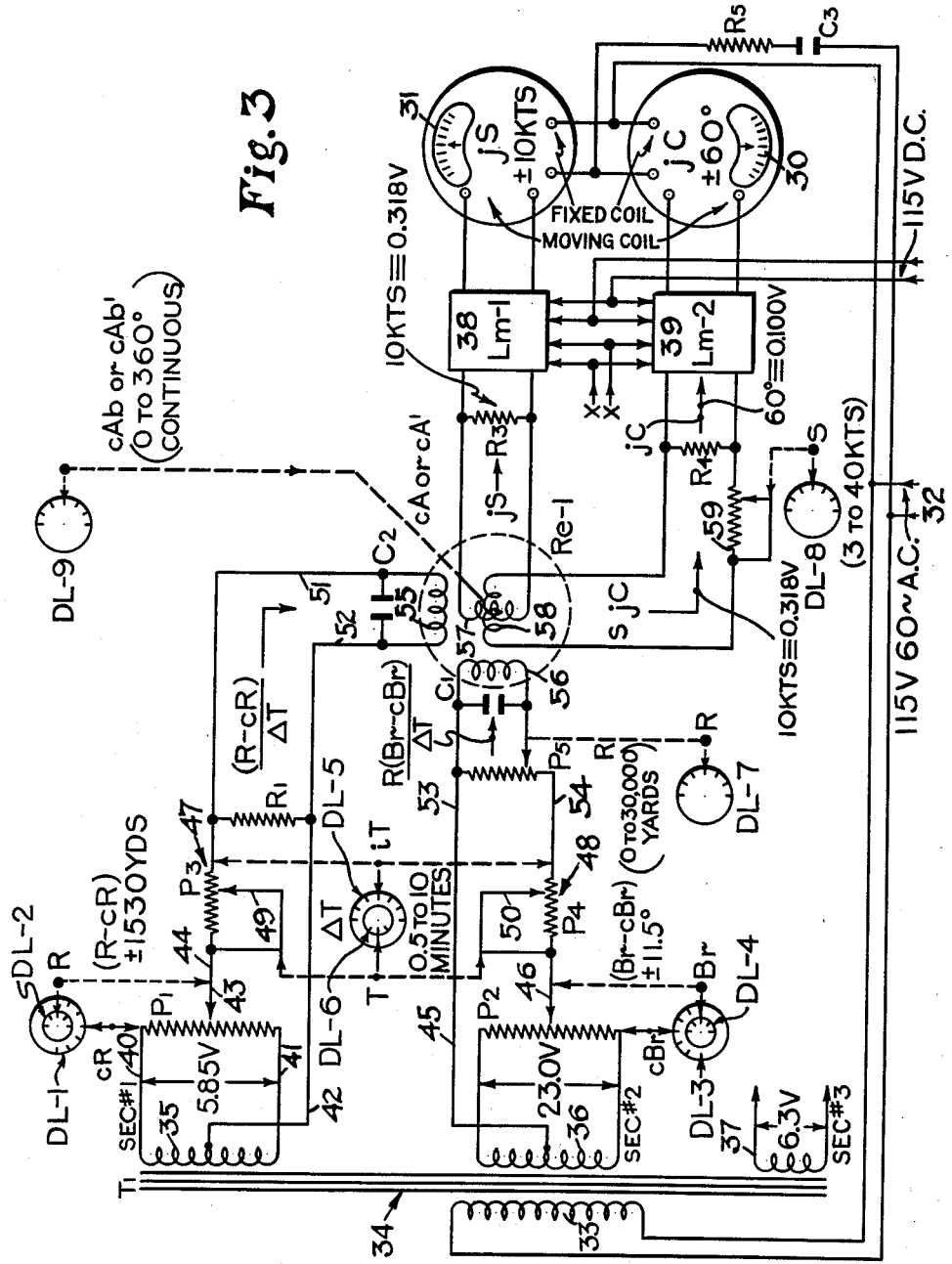

United States Patent Office 3,007,635
Patented Nov. 7, 1961

3,007,635
ORDNANCE APPARATUS FOR COMPUTING TARGET OBSERVATION ERROR CORRECTION FACTORS
Richard Y. Miner, New York, and Clifford F. Abt, Long Island City, N.Y., assignors to American Bosch Arma Corporation
Filed Jan. 19, 1946, Ser. No. 642,380
12 Claims. (Cl. 235—61.5)

This invention relates to ordnance calculating apparatus, and has particular reference to a computer for determining errors and calculating corrections in a system for measuring the speed and direction of travel of a moving target.

In directing projectiles, such as marine torpedoes, from a moving base, such as a ship, against a moving target, it is customary to measure the range and relative target bearing of the target accurately and to estimate its speed and course as closely as possible. These measured and estimated values are fed into range and bearing integrators for predicting the probable line of target travel. After a measured time interval, new measurements of the position of the target are made and its actual position is compared with the generated position predicted by the integrators. Appropriate corrections are still to be made and, inasmuch as such corrections are usually critical, the accuracy of the system often depends upon proper calculation of the errors and the timely indication of the necessary corrections.

In accordance with this invention, an error calculating apparatus for ordnance is provided, in which the errors are automatically and continuously determined and corresponding corrections calculated for use in gun laying or other projectile-directing operations, so that the speed and direction of travel of the target may be accurately indicated.

In a preferred embodiment of the invention, input means is provided, preferably in the form of a manual dial switch, by which the difference between observed and generated values of range and bearing are introduced as amplitude modulations of a carrier voltage, by rotating the windings of corresponding potentiometers, carrying carrier-frequency current, to a position proportional to the generated values, and rotating the brushes of the same to positions proportional to the respective observed values, whereupon the relative positions of the brushes to the windings will provide modulation amplitudes proportional to the said difference in each case. Means are also provided for dividing at least two such values of modulated carrier by the same difference of two time values by the aforementioned duplex setting and a novel arrangement of resistance windings to be described. The last-named modulated carriers are then further modulated by the function of an angle dialed in by hand, and one of these results is divided by another assumed value, and the amplitudes of at least two of the resultant modulations are indicated as corrections that are required to be made.

For a more complete understanding of the invention, reference may be had to the accompanying drawing, in which:

FIG. 3 is an electrical diagram of a preferred form of the invention.

Figure 1:
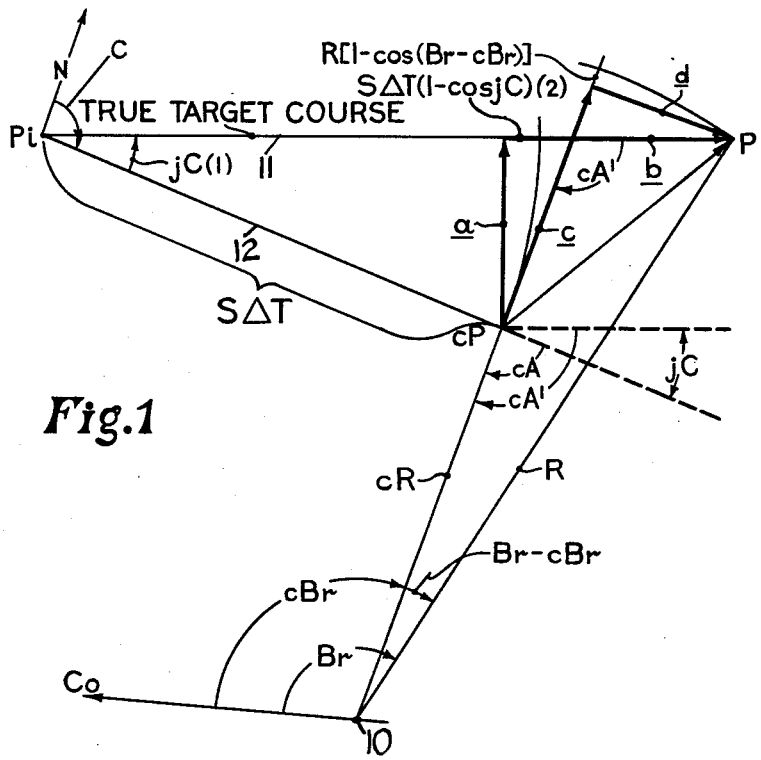
FIGURE 1 is a diagram of the type of problem solved by the calculating apparatus of this invention.

The mathematical terms shown in the drawings are defined as follows:

$cA$, generated target angle
$cA'$, generated target angle corrected for computed correction to target course
$cAb$, generated angle on the bow
$cAb'$, generated angle on the bow corrected for computed correction to target course
$Br$, observed relative target bearing
$cBr$, generated relative target bearing
$C$, estimated target course
$jC$, computed correction to target course
$R$, observed target range
$cR$, generated target range
$S$, estimated target speed
$jS$, computed correction to target speed
$\Delta T$, time interval between two successive observations.

Referring to FIG. 1, the measurements are presumed to be made from a ship located at point 10 of a target actually traveling along line 11 from point $Pi$ to point $P$ during the time interval $\Delta T$. However, assuming that the director operator on the ship at 10 has erroneously estimated that the travel of the target is along line 12 to point $cP$, it will be seen that the error amounts to the angle $jC$ between true target course 11 and supposed course 12, thus resulting after time $\Delta T$ in a false predicted range indicated as $cR$, as well as a false predicted relative target bearing, $cBr$. It will be understood that the error angle $jC$ is usually quite small, and is shown greatly exaggerated in FIGS. 1 and 2 in the interest of clarity. The true range, after time $\Delta T$, is indicated as $R$ and the true range bearing as $Br$, whereas the error in range is defined as $(R-cR)$ and the error in bearing as $(Br-cBr)$.

Although the errors exist because of the fictitious travel line 12 at the start of the time period $\Delta T$, the director operator on the ship at 10 will not have been informed of such errors during that period, since true target course 11 can only be known to him after new measurements of range R, and relative bearing, $Br$, are made at the end of that period, $\Delta T$. Hence, when the target was at point $Pi$, at the beginning of time period $\Delta T$, the operator set integrators in accordance with estimated target speed, S, and estimated target course, C, and then proceeded to generate the fictitious course 12 until new measurements of range, R, and target bearing, $Br$, were obtained. When new measurements of range R and bearing $Br$ have been made at the end of time period $\Delta T$, the diagram of FIG. 1 represents the situation. Consequently, the errors, $jC$ in course and $jS$ in speed, must be calculated, and the resulting corrections applied in order to provide true target course and speed data.

Figure 2:
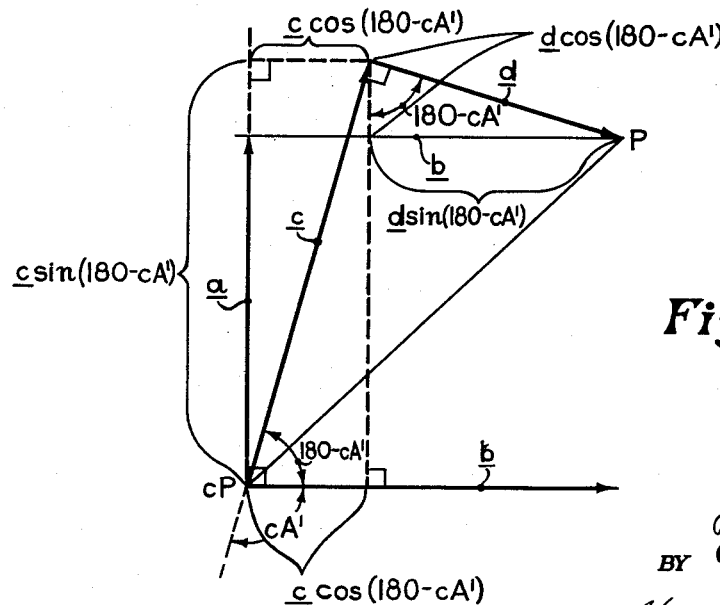
FIG. 2 is an enlargement of a portion of the same.

According to FIGS. 1 and 2 the error between actual target position P and calculated target position $cP$ may be represented by vectors $a$ and $b$, vector $b$ being in the line of true target course 11 and vector $a$ being perpendicular thereto. If S represents the assumed target speed and $\Delta T$ the time interval, the distance along line 12 from $Pi$ to $cP$ equals $S\Delta T$. Therefore, $jC$, the error in course, is found by the formula $$-\sin jC = \frac{a}{S\Delta T} \qquad (1)$$

and $jS$, the error in speed, may be found by formula $$jS\Delta T = b - S\Delta T(1 - \cos jC) \qquad (2)$$

both of which may be simplified by assuming that sin $jC=jC$ and that cos $jC=1$, which, for the errors usually encountered in gun fire calculations, introduce no more than a tolerable variation. With these assumptions, the Formulas 1 and 2 become, respectively, $$-jC = \frac{a}{S\Delta T} \qquad (3)$$

$$jS = \frac{b}{\Delta T} \qquad (4)$$

However, the vectors $a$ and $b$ in these equations are still unknown and it is therefore necessary to evaluate them in known terms, for instance, in terms of vectors $c$ and $d$, best shown in FIG. 2, which are respectively perpendicular to and parallel to the generated target course 12, and which are $$c = (R - cR) - R[1 - \cos(Br - cBr)] \qquad (5)$$

$$d = R \sin(Br - cBr) \qquad (6)$$

As was done in the Formulae 1 and 2, these equations may be simplified by assuming that sin $$(Br - cBr) = Br - cBr$$

and that cos $(Br - cBr) = 1$, whereupon $$c = R - cR \qquad (7)$$

$$d = R(Br - cBr) \qquad (8)$$

thus giving $c$ and $d$ in terms of known quantities, R, cR, Br and cBr.

From FIG. 2 it may be seen that $$b = c \cos(180 - cA') + d \sin(180 - cA') \qquad (9)$$

$$a = c \sin(180 - cA') - d \cos(180 - cA') \qquad (10)$$

Substituting values from (7) and (8)

$$b = -(R - cR) \cos cA' + R(Br - cBr) \sin cA' \qquad (11)$$

$$a = (R - cR) \sin cA' + R(Br - cBr) \cos cA' \qquad (12)$$

Substituting these values in (3) and (4), the respective bearing and speed errors are given as:

$$-jC = \frac{R(Br - cBr)}{S\Delta T}(\cos cA') + \frac{(R - cR)}{S\Delta T}(\sin cA') \qquad (13)$$

$$jS = \frac{R(Br - cBr)}{\Delta T}(\sin cA') - \frac{(R - cR)}{\Delta T}(\cos cA') \qquad (14)$$

For practical purposes, angle $cA$ may be substituted in these equations for angle $cA'$ without serious error, since $jC$ is usually quite small.

These equations may be automatically solved by the mechanism of this invention as shown in FIG. 3, and the quantities $jC$ and $jS$, target course and speed errors, respectively, for time period $\Delta T$, are indicated on the meters 30 and 31. In the arrangement of FIG. 3, 115 volt, 60 cycle carrier current is supplied from the source 32 to the single primary winding 33 of a compound transformer 34 having three secondary windings 35, 36 and 37. Secondary winding 37 supplies, by wires not shown, filament current for the vacuum tubes of limiters 38 and 39, whereas secondary winding 35 supplies potentiometer P1, and secondary winding 36 supplies potentiometer P2.

Potentiometer winding P1 is bodily rotatable by means of dial DL-1, when the latter is adjusted in accordance with generated value of range cR. The winding P1 is connected through flexible leads 40 and 41 to the ends of transformer secondary winding 35 which has a center tap, 42. Brush 43 of potentiometer $P_1$ is independently rotatable by dial DL-2, in accordance with observed value of range, R, dial DL-2 being concentric with DL-1.

The resulting output of potentiometer P1 on leads 42 and 44 is a voltage proportional to the value R-cR, as previously mentioned. This difference may be positive or negative, and the phase of the current fed into the wires 42 and 44 is reversed for this reason, as the brush 43 passes the center point of the potentiometer winding P1, inasmuch as transformer winding 35 is center tapped, as shown.

Similarly, winding 36 feeds potentiometer P2, which is adjustable by dial DL-3 as the latter is set in accordance with the generated value of bearing, cBr, whereas the brush of potentiometer P2 is adjusted by dial DL-4 in accordance with observed value of bearing Br. These adjustments of potentiometer P2 produce on the leads 45 and 46 a voltage of phase and amplitude representative of the difference Br-cBr.

In order to determine mean rate of change of range and mean rate of change of bearing, the value on leads 42 and 44 and that on leads 45 and 46 is divided by the same quantity, viz., elapsed time $\Delta T$, in the divider units 47 and 48. Divider unit 47 comprises a special variable resistance P3 connected in lead 44 and a fixed bridging resistance $R_1$ connected across leads 42 and 44. Divider unit 48 is similar, including variable resistance P4 connected in lead 46 and bridging resistance P5 connected across leads 45 and 46. Both resistances P3 and P4 are angularly adjustable by outer dial DL-5 and their respective brushes 49 and 50 are angularly adjustable there on by inner dial DL—6.

Considering the action of the divider unit 47 containing resistance P3, the setting on the outer dial DL-5 of the time of beginning of the measuring operation, results in rotation of resistance P3 bodily to a corresponding angular position for initial starting time, $iT$. At the same time, resistance P4 is also rotated to the same angular position, the operation of unit 48 being the same as that of unit 47. The inner dial DL-6 is rotated to a position corresponding to the end time T of the operation, which may be between 0.5 and 10 minutes, for example. Dial D-6 sets the brushes 49 and 50, so that the unbridged portion $R_p$ of the resistance P3 is in series with bridging resistance $R_1$ and that of P4 is in series with resistance P5.

Considering the effect of the operation in the case of divider unit 47, for example, and assuming that $e_1$ represents the voltage value on the leads 42 and 44 from potentiometer P1, and $e_0$ the voltage value on leads 51 and 52 across the ends of fixed resistance $R_1$ and $r$ represents the total value of the variable resistor P3 then, $i$ being the current flow $$e_1 = i(R_1 + R_p) \qquad (15)$$

$$e_0 = iR_1 \qquad (16)$$

and $$\frac{e_0}{e_1} = \frac{R_1}{R_1 + R_p} \qquad (17)$$

But if $x$=resistance value of $R_p$ for any value of $X$ of slider position, then the resistance of $x$ should be of the value so that $$x = R_1\left(\frac{X}{X_{\min}}\right) - R_1 \qquad (18)$$

Substituting (18) in (17)

$$\frac{e_0}{e_1} = \frac{R_1}{R_1 + R_1\dfrac{X}{X_{\min}} - R_1} = \frac{X_{\min}}{X}$$

Therefore $$e_0 = X_{\min}\left(\frac{e_1}{X}\right) \qquad (19)$$

the total resistance, $r$, of the variable resistor P3 being $$R_1\left(\frac{X_{\max}}{X_{\min}} - 1\right)$$

The time interval $\Delta T$, which is indicated by relative position of the dials DL-5 and DL-6, is made proportional to the term X, so that as indicated by Equation 19 the units 47 and 48 are dividers and therefore with $X_{min}$ having a finite value, and with proper scaling, the quantity represented by the voltage amplitude on the leads 51 and 52 is $$\left(\frac{R-cR}{\Delta T}\right)$$

and, similarly, the voltage amplitude on leads 53 and 54 is $$\left(\frac{Br-cBr}{\Delta T}\right)$$

Leads 51 and 52 feed the first of these voltages into stator coil 55 of trigonometric resolver R$e$-1 and leads 53 and 54 feed the other voltage into multiplier P5 whose brush is adjusted by range dial DL-7 so that the quantity is changed to $$R\left(\frac{Br-cBr}{\Delta T}\right)$$

and fed into stator coil 56 of resolver R$e$-1.

Resolver R$e$-1 comprises essentially a transformer having primary windings or stator coils 55 and 56 arranged in space quadrature, in whose joint field the secondary windings or rotor coils 57 and 58 are arranged in space quadrature on a suitable shaft adapted to be rotated through an angle by dial DL-9. Voltage inputs impressed on stator coils 55 and 56 set up a joint field so that there are induced in rotor coils 57 and 58 the sine and cosine functions of the angle through which the rotor has been rotated by dial DL-9.

In operation of the resolver RE-1, the "angle of the bow," $cAb$, or $cAb'$, is dialed at DL-9 and rotates the connected rotor coil assembly 57, 58, thus causing a voltage proportional to the quantity $jS$ to be induced in coil 57 and a voltage proportional to the quantity $SjC$ to be induced in rotor coil 58, according to the mathematical derivations demonstrated by Formulae 1–14 above.

The quantity $jS$, which is the calculated error in speed of the target, feeds through limiter 38 into meter 31 and is indicated by the moving coil pointer on its scale. The quantity $SjC$ feeds to a divider 59 where the quantity S, estimated target speed, is divided out with dial DL-8 and the resultant quantity $jC$, error in target course, is fed through limiter 39 and is indicated by the moving coil pointer on the scale of meter 30.

It will be understood that the operations described above occur practically simultaneously, changing immediately when any input dial is readjusted. In this way, after only a second pair of observations is made and introduced as described, the corrections are calculated by the apparatus of this invention and may be applied to the ship's computer, giving reasonable certainty of the course and speed of a target entering into its computations without much attention by the operator and much more accurately than by any arrangement employed heretofore.

Although a preferred form of the invention has been illustrated and described herein, it is to be understood that the invention is not limited thereby but is susceptible of changes in form and detail without departing from the scope of the invention as defined by the appended claims.

We claim:

1. In ordnance calculating apparatus for determining corrections of errors in position of a relatively moving target for measured and estimated input values during a measuring time period, the combination of a voltage source, a potentiometer having a movable winding connected to said source and a brush movable relatively to said winding, means for adjusting said winding and said brush in accordance with said respective input values to provide variation of said voltage in accordance with the difference between said input values, an electrical divider connected to the output of said potentiometer and having a movable winding and a brush movable relatively thereto, means for severally adjusting said divider winding and brush in accordance with the start and end of said measuring time period, a transformer having a stator primary winding and rotor secondary winding, connections between the output of said divider and said stator winding, means for adjusting said rotor winding in accordance with an angle between the line to the target and a predetermined base line, and means energized by the voltage induced in said rotor winding for indicating a correction in the determined position of the target.

2. In ordnance calculating apparatus for determining corrections of errors in position of a relatively moving target for measured and estimated input range values during a measuring time period, the combination of a voltage source, a potentiometer having a movable winding connected to said source and a brush movable relatively to said winding, means for adjusting said winding in accordance with said measured range input value and said brush in accordance with said estimated range input values to provide variation of said voltage in accordance with the difference between said input values, an electrical divider connected to the output of said potentiometer and having a movable winding and a brush movable relatively thereto, means for severally adjusting said divider winding and brush in accordance with the start and end of said measuring time period, a transformer having a stator primary winding and rotor secondary winding, connections between the output of said divider and said stator winding, means for adjusting said rotor winding in accordance with an angle between the line to the target and a predetermined base line, and means energized by the voltage induced in said rotor winding for indicating a correction in the determined position of the target.

3. In ordnance calculating apparatus for determining corrections of errors in position of a relatively moving target for measured and estimated input bearing values during a measuring time period, the combination of a voltage source, a potentiometer having a movable winding connected to said source and a brush movable relatively to said winding, means for adjusting said winding in accordance with said measured bearing input value and said brush in accordance with said estimated bearing input values to provide variation of said voltage in accordance with the difference between said input values, an electrical divider connected to the output of said potentiometer and having a movable winding and a brush movable relatively thereto, means for severally adjusting said divider winding and brush in accordance with the start and end of said measuring time period, a transformer having a stator primary winding and rotor secondary winding, connections between the output of said divider and said stator winding, means for adjusting said rotor winding in accordance with an angle between the line to the target and a predetermined base line, and means energized by the voltage induced in said rotor winding for indicating a correction in the determined position of the target.

4. In ordnance calculating apparatus for determining corrections of errors in position of a relatively moving target for measured and estimated input range and bearing values during a measuring time period, the combination of a voltage source, a pair of potentiometers each having a movable winding connected to said source and a brush movable relatively to said winding, means for adjusting said winding severally in accordance with said measured range and bearing input values and said brushes severally in accordance with the corresponding estimated range and bearing input values to provide variation of said voltage in accordance with the difference between said respective measured and estimated range and bearing input values, a pair of electrical dividers severally connected to the output of said potentiometers and each having a movable winding and a brush movable relatively thereto, means for severally adjusting said divider windings and brushes in accordance with the start and end of said measuring time period, a transformer having a pair of stator primary windings and a pair of rotor secondary windings, several connections between the outputs of said divider and said stator windings, means for adjusting said rotor windings in accordance with an angle between the line to the target and a predetermined base line, and means energized by the voltage severally induced in said rotor winding for indicating a correction in the determined position of the target.

5. In ordnance calculating apparatus for determining corrections of errors in position of a relatively moving target for measured and estimated input values during a measuring time period, the combination of a voltage source, a potentiometer having an angularly movable winding connected to said source and a brush movable angularly relatively to said winding, dial means for angularly adjusting said winding and said brush in accordance with said respective input values to provide variation of said voltage in accordance with the difference between said input values, an electrical divider connected to the output of said potentiometer and having an angularly movable winding and a brush movable angularly relatively thereto, dial means for severally adjusting said divider winding and brush in accordance with the start and end of said measuring time period, a transformer having a stator primary winding and a rotor secondary winding, connections between the output of said divider and said stator winding, means for adjusting said rotor winding in accordance with an angle between the line to the target and a predetermined base line, and means energized by the voltage induced in said rotor winding for indicating a correction in the determined position of the target.

6. In ordnance calculating apparatus for determining corrections of errors in position of a relatively moving target for measured and estimated input range values during a measuring time period, the combination of a voltage source, a potentiometer having an angularly movable winding connected to said source and a brush movable angularly relatively to said winding, dial means for angularly adjusting said winding in accordance with said measured range input value and said brush in accordance with said estimated range input values to provide variation of said voltage in accordance with the difference between said input values, an electrical divider connected to the output of said potentiometer and having an angularly movable winding and a brush movable angularly relatively thereto, means for severally adjusting said divider dial winding and brush in accordance with the start and end of said measuring time period, a transformer having a stator primary winding and rotor secondary winding, connections between the output of said divider and said stator winding, means for adjusting said rotor winding in accordance with an angle between the line to the target and a predetermined base line, and means energized by the voltage induced in said rotor winding for indicating a correction in the determined position of the target.

7. In ordnance calculating apparatus for determining corrections of errors in position of a relatively moving target for measured and estimated input bearing values during a measuring time period, the combination of a voltage source, a potentiometer having an angularly movable winding connected to said source and a brush movable angularly relatively to said winding, dial means for angularly adjusting said winding in accordance with said measured bearing input value and said brush in accordance with said estimated bearing input values to provide variation of said voltage in accordance with the difference between said input values, an electrical divider connected to the output of said potentiometer and having an angularly movable winding and a brush movable angularly relatively thereto, dial means for severally adjusting said divider winding and brush in accordance with the start and end of said measuring time period, a transformer having a stator primary winding and rotor secondary winding, connections between the output of said divider and said stator winding, means for adjusting said rotor winding in accordance with an angle between the line to the target and a predetermined base line, and means energized by the voltage induced in said rotor winding for indicating a correction in the determined position of the target.

8. In ordnance calculating apparatus for determining corrections of errors in position of a relatively moving target for measured and estimated input range and bearing values during a measuring time period, the combination of a voltage source, a pair of potentiometers each having an angularly movable winding connected to said source and a brush movable angularly relatively to said winding, dial means for angularly adjusting said windings severally in accordance with said measured range and bearing input values and said brushes severally in accordance with the corresponding estimated range and bearing input values to provide variation of said voltage in accordance with the difference between said respective measured and estimated range and bearing input values, a pair of electrical dividers severally connected to the output of said potentiometers and each having an angularly movable winding and a brush movable angularly relatively thereto, means for severally adjusting said divider dial windings and brushes in accordance with the start and end of said measuring time period, a transformer having a pair of stator primary windings and a pair of rotor secondary windings, several connections between the output of said divider and said stator windings, means for adjusting said rotor windings in accordance with an angle between the line to the target and a predetermined base line, and means energized by the voltages severally induced in said rotor winding for indicating a correction in the determined position of the target.

9. In ordnance calculating apparatus for determining corrections of errors in position of a relatively moving target for measured and estimated input values during a measuring time period, the combination of an input transformer having a center-tapped secondary winding constituting a voltage source, a potentiometer having a movable winding connected to said source and a brush movable relatively to said winding, means for adjusting said winding and said brush in accordance with said respective input values to provide variation of said voltage in accordance with the difference between said input values, an electrical divider connected to the output of said potentiometer and having a movable winding and a brush movable relatively thereto, means for severally adjusting said divider winding and brush in accordance with the start and end of said measuring time period, a transformer having a stator primary winding and a rotor secondary winding, connections between the output of said divider and said center-tap of said input transformer to said stator winding, means for adjusting said rotor winding in accordance with an angle between the line to the target and a predetermined base line, and means energized by the voltage induced in said rotor winding for indicating a correction in the determined position of the target.

10. In error calculating apparatus for a trial and error system of determining course and speed of a distant moving object, wherein range and relative bearing of said object are periodically measured and speed and course of the same estimated for any period between measurements, the combination of a voltage source, means for producing from said voltage a first amplitude modulation in which the amplitude represents the difference between a first and a second voltage measurement and the phase the relative magnitude of said first and second voltage measurements, said means comprising a center tapped reactance having end terminals, means comprising a rotatable resistance winding connected across said end terminals, a rotatable brush cooperating with said rotatable resistance winding, wires connected to said brush and said center tap as outputs of said difference, and means for exciting said reactance with voltage.

11. In error calculating apparatus for a trial and error system of determining course and speed of a distant moving object, wherein inputs of range and relative bearing of said object are periodically measured and speed and course of the same are estimated for any period between measurements, the combination of a voltage source, means for producing from said voltage a first amplitude modulation in which the amplitude represents the difference between a first and a second measurement and the phase the relative magnitude of said first and second measurements, means for receiving a voltage variation representing difference in range measurements, means for receiving a voltage variation representing difference in bearing measurements, means for producing a voltage variation representing the difference in time between said first and second measurements, means for dividing both said received differences by said elapsed time difference which comprises a variable resistance and a fixed resistance in series for each said received difference, said variable resistance being rotatable according to initial time, a brush on each variable resistance rotatable according to actual time, and connecting wires from said fixed resistances to terminals for supplying voltage variations proportional to mean rate of change in range and mean rate of change in bearing as outputs.

12. In electromechanical calculating apparatus for dividing both the difference between two quantities and the difference between two other quantities by the difference between two third quantities, the combination of a voltage source, a movable reactor and a movable brush thereon for producing a value proportional to said first-mentioned difference, another movable reactor and a movable brush thereon for producing a value proportional to said second difference, a third movable reactor and a movable brush thereon, a fourth movable reactor and a movable brush thereon, said third and said fourth movable reactors adapted to move as one, said third and said fourth movable brushes adapted to move as one, means for setting all said movable reactors and said movable brushes, electrical connections therebetween, electrical connections between said voltage source and all of said reactors, and variable voltage-responsive means for indicating the quotients of said divisions.

References Cited in the file of this patent

UNITED STATES PATENTS

| | | |
|---|---|---|
| 1,345,706 | Routin | July 6, 1920 |
| 1,893,009 | Ward | Jan. 3, 1933 |
| 2,382,994 | Holden | Aug. 21, 1945 |